July 29, 1969 J. E. FAVORS 3,458,009
EVACUATION SLIDE
Filed Nov. 28, 1967 3 Sheets-Sheet 1
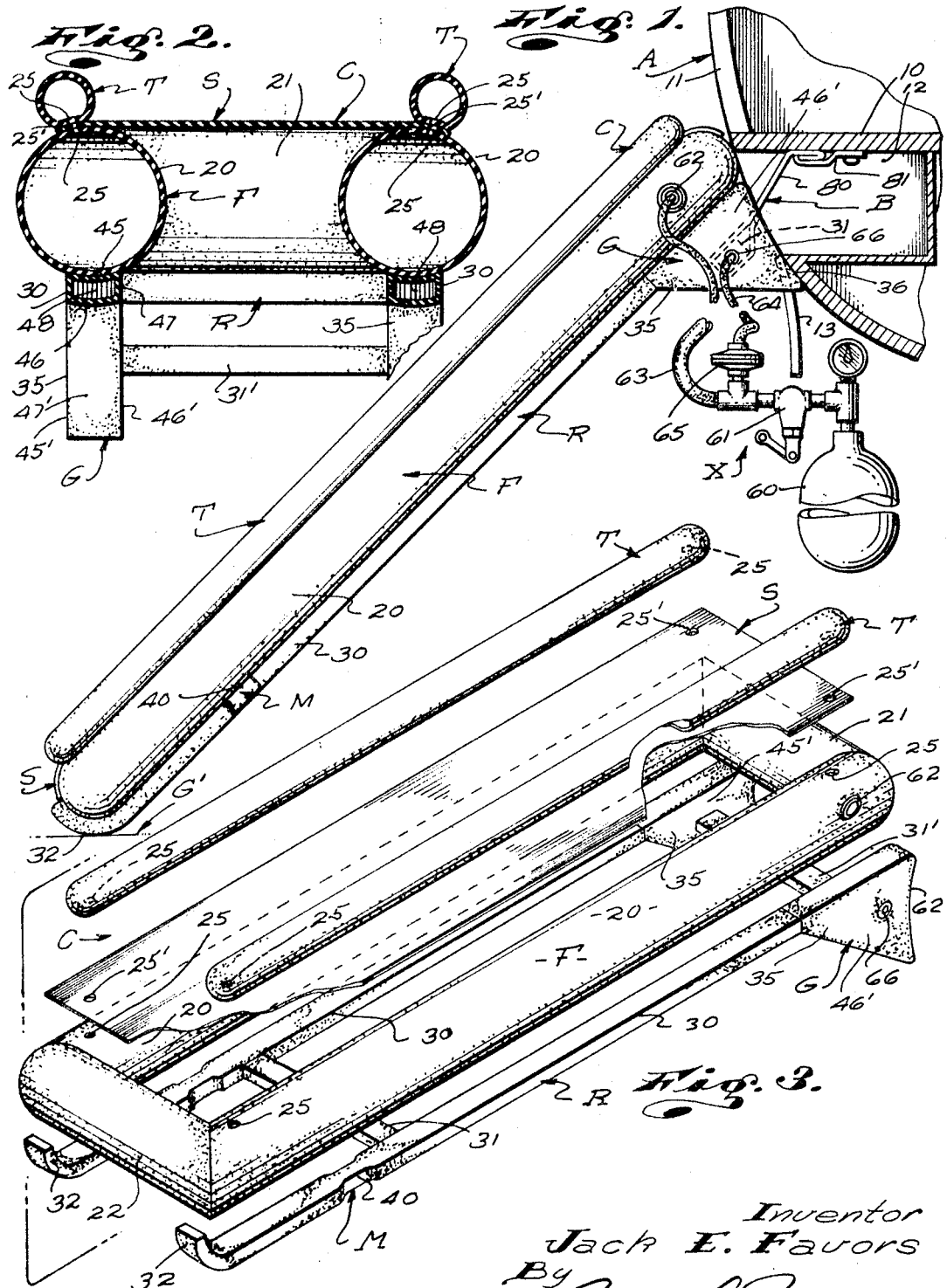
Inventor
Jack E. Favors
By
George A. Mixsell
Attorney

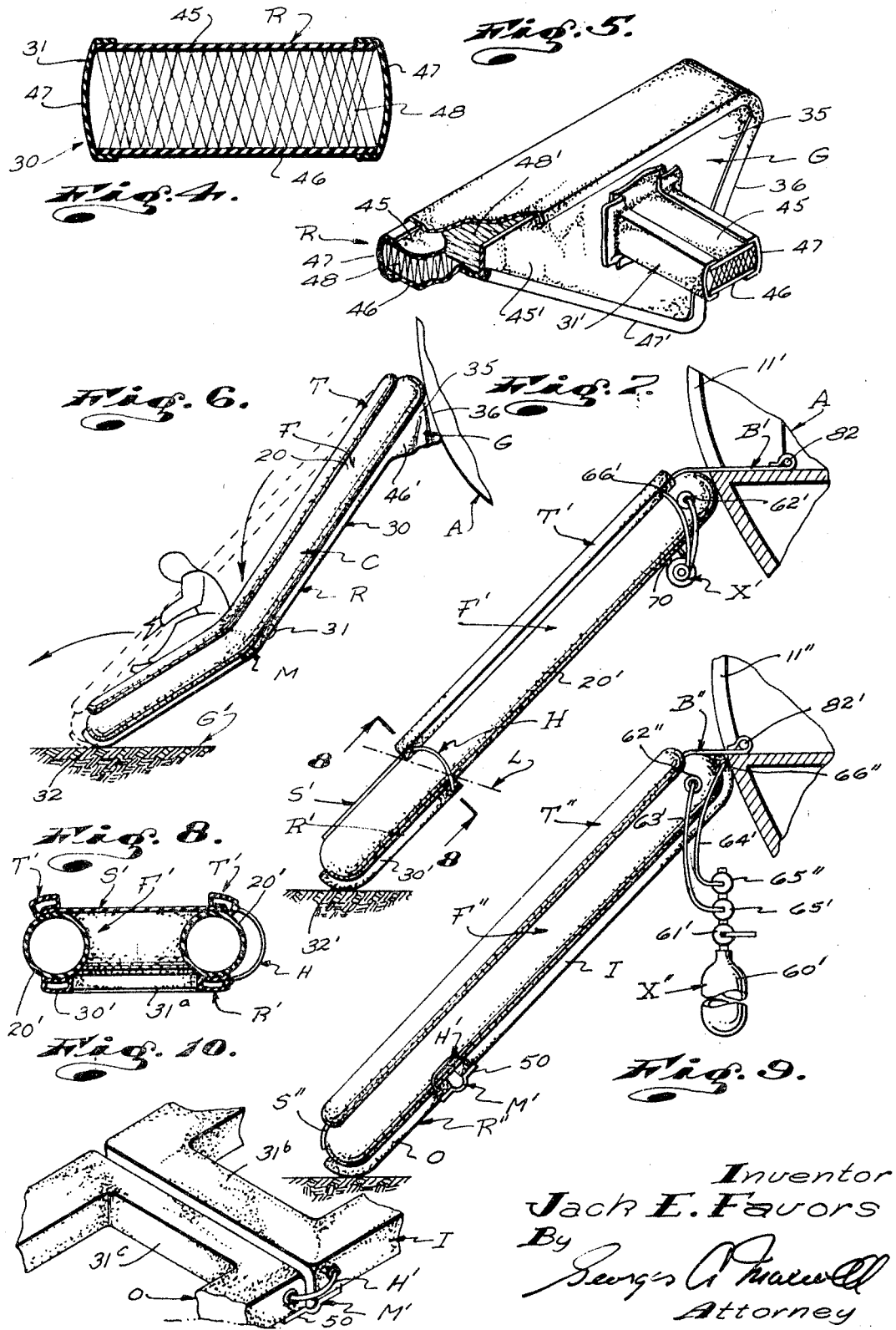

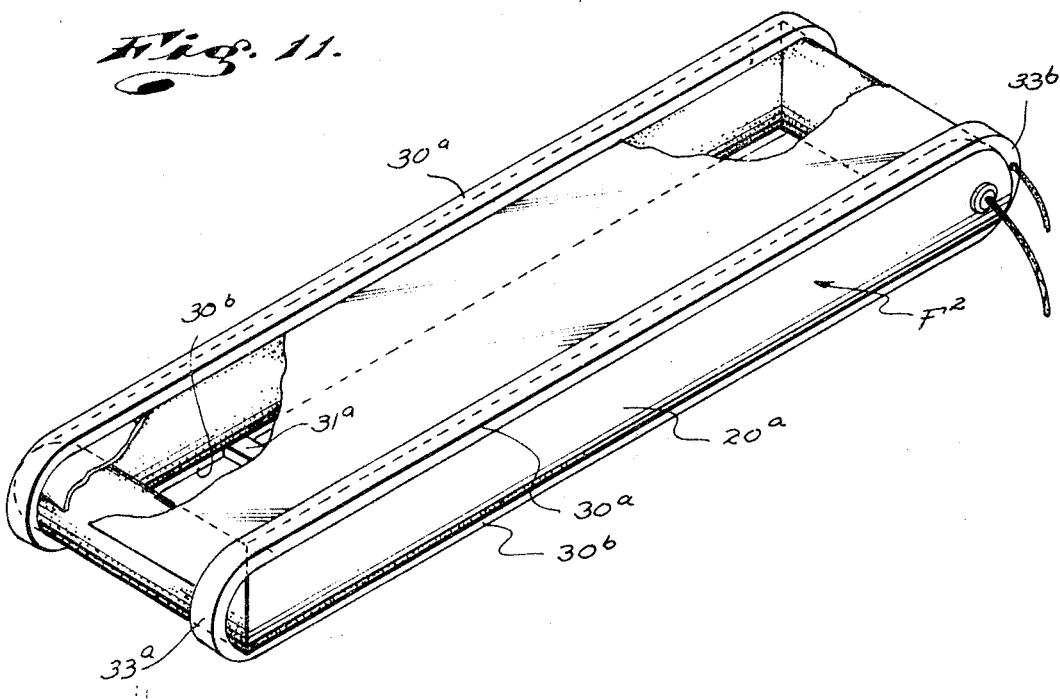

United States Patent Office 3,458,009
Patented July 29, 1969

3,458,009
EVACUATION SLIDE
Jack E. Favors, Lakeview Terrace, Calif., assignor to Global Systems, Inc., Sun Valley, Calif., a corporation of Delaware
Filed Nov. 28, 1967, Ser. No. 686,096
Int. Cl. A62b 1/20; B65g 11/10
U.S. Cl. 182—48           18 Claims

ABSTRACT OF THE DISCLOSURE

An escape chute including, an elongate, substantially horizontal, inflatable primary frame with inner and outer ends, substantially parallel sides, top and bottom planes and including a pair of laterally spaced, longitudinally extending, tubular beams and transversely extending tubular spreaders connected with and extending between the adjacent ends of the beams, an elongate, flexible strip adjacent the top plane of the primary frame, having side and end portions fixed to the beams and spreaders of said primary frame and defining a substantially upwardly disposed central longitudinally extending slide surface, inflatable reinforcing means to reinforce and stiffen the primary frame and including longitudinally extending inflatable stiffener tubes fixed to and extending longitudinally of the beams of the primary frame and thwart tubes connected with the stiffener tubes and extending laterally between the beams adjacent the bottom plane of the primary frame and spaced below the strip, the volumertic extent of the inflatable reinforcing means being a fraction of the volumetric extent of the primary frame, anchoring means at the inner end of the construction to connect with a related support structure and inflating means to inflate the primary frame with a large volume of gas at lower pressure and to inflate the reinforcing means with a small volume of gas at high pressure.

---

This invention has to do with an inflatable load supporting structure and is more particularly concerned with an improved inflatable escape chute to facilitate the escape of persons from grounded, disabled, passenger aircraft, where no convenient means for disembarkation is available and the exit opening or door in the aircraft is so high above ground level that unassisted exit from the aircraft would be hazardous.

The prior art has provided inflatable escape chute constructions for the same purpose for which the present invention is intended. The escape chute constructions provided by the prior art are such that they can be compactly stowed and carried in an aircraft in convenient proximity to an exit door or opening and are such that when their use is required, they can be easily, quickly and conveniently placed in working position and inflated.

Chutes of the general character referred to are approximately fifteen (15) feet in length and three and a half or four feet wide and, in accordance with normal escape chute construction, are characterized by longitudinally extending tubular beams, transversely extending tubular spreaders at and between the ends of the beams, transversely extending tubular thwart tubes extending between the beams intermediate the ends thereof and a membrane or sheet between and carried by the stringers and spreaders and defining a substantially upwardly disposed, central, longitudinally extending slide surface.

Chute constructions of the general character referred are made or established of light weight, thin, flexible rubberized or plasticized fabric sheeting cut to predetermined patterns and suitably assembled and secured together as by cement.

The ordinary or conventional chute of the character referred to above has an upper inner end to occur adjacent the outside of the aircraft to which it is related, adjacent the sill of the escape hatch or door in the aircraft and a lower outer end to engage the ground at a point spaced laterally of the aircraft and so the chute is disposed at an appropriate angle, for example, forty or forty-five degrees.

The upper inner ends of such chutes are provided with means for securing the upper ends of the chutes in proper working position with their related aircraft, which means have become substantially standardized and include a longitudinally outwardly extending tongue-like extension of the slide surface defining sheet or membrane and a transversely extending anchor bar carried by the extension and having laterally, and outwardly projecting end portions to engage the opposite inner sides of the door frame structure so as to stop and limit outward movement and displacement of the chute relative to said door.

Escape chutes of the character referred to above further include self-contained inflating means which means are characterized by bottles or cylinders of compressed gas, an aspirator carried by the chute and establishing communication between the interior and exterior thereof, a line extending between the gas cylinder and the aspirator and a manually operable control valve in said line. Such inflating means are adapted to affect inflating of the chutes with a large volume of gas and air at relative low pressure by means of a small volume of high pressure gas.

In practice, the longitudinally extending tubular beams of the ordinary escape chute are load supporting beam structures when inflated. The beams are rather large in diameter, approximately 24 inches and are inflated to between 2 and 3 pounds per square inch.

Further, the ordinary escape chute construction, with its related inflating means, is provided with a single aspirator and the several tubular members and/or parts are in open communication with each other in order to receive the necessary gas and air to effect their inflation and are inflated to the same pressure.

As a result of the noted size and extent of such chutes and as a result of the relatively low pressure to which they are inflated, it will be apparent that they are not too strong and rigid and are subject to bending, twisting and otherwise becoming distorted when in use, that is, when escapees are engaged and slide down the slide surfaces thereof. To stiffen and strengthen such chutes in an obvious and straight-forward fashion, as by using heavier and stiffer fabrics, enlarging the load supporting tubular parts and/or increasing the air and gas pressures, would result in so increasing the size and weight of the chutes that they would be excessively large and heavy and the inconveniences and disadvantages of their normal presence in an aircraft would outweigh their potential value. Accordingly, such chutes are, from the standpoint of size, weight and structural stability, a compromise and afford as strong and durable a structure as space and weight will permit.

Many efforts have been made to improve and increase the structural strength and stiffness of such escape chute constructions without adversely increasingly the size and weight thereof, but such attempts have met with limited success and have generally resulted in materially increasing the cost of such structures by complicating their manufacture. Typical of such efforts to improve the structural characteristics of inflatable escape chutes is to form the longitudinal tubular beam members in sections, the several sections being tapered to vary and control the effective cross-section of the beams at predetermined stations along their longitudinal extent and arranging adjacent sections of the beams in angular relationship to each other to control the bending or breaking action of the beams when the structures are in use. Other efforts along these lines have involved the addition of secondary, longitudinally extending, generally smaller tubular stiffener members or stringers along the larger primary tubular members or beams. Such secondary tubular stringers, as employed by the prior art, communicate with their related primary tubular members for their supply of air and gas and are inflated to the same pressure as their related primary members or beams. Accordingly, their effectiveness to stiffen and reinforce the primary beam members is limited.

An object of my invention is to provide an improved escape chute construction of the general character referred to having improved highly effective and dependable reinforcing and stiffening means. More specifically, it is an object of the present invention to provide a structure of the character referred to having a primary low pressure, large volume inflatable frame structure and a secondary, high pressure, low volume inflatable reinforcing frame structure related to the primary frame structure.

Yet another object and feature of my invention is to provide a chute construction of the general character referred to having novel inflating means to conduct a large volume of air and gas to the primary, low pressure frame structure and a small volume of high pressure gas to the high pressure secondary or reinforcing frame structure.

Still further, it is an object and a feature of the present invention to provide pressure regulating means in the inflating means to control the pressure and rate of the flow of gas into the secondary reinforcing frame structure.

A further object of the present invention is to provide a novel inflatable, secondary, high pressure reinforcing frame structure related to a primary, low pressure inflatable frame structure which is such that desired resiliency and breaking action of the overall construction, for the purpose of advantageously assisting escapees to disembark or leave the lower outer end portion of the construction, can be easily and conveniently built into the construction.

Still another object and feature of my invention is to provide a secondary reinforcing frame structure of the character referred to having novel anchoring means at the inner upper end of the chute construction to engage a related aircraft and to maintain the inner upper end of the chute in proper working relationship to said aircraft.

The foregoing objects and features and other objects and features of my invention will be apparent and will be fully understood from the following detailed description of typical preferred forms and applications of my invention throughout which description reference is made to the accompanying drawings, in which:

FIG. 1 is a side elevational view of my new chute construction.

FIG. 2 is an enlarged sectional view taken substantially as indicated by line 2—2 on FIG. 1.

FIG. 3 is an exploded isometric view of the construction shown in FIG. 1.

FIG. 4 is an enlarged detailed sectional view taken substantially as indicated by line 4—4 on FIG. 3.

FIG. 5 is an isometric view of a portion of my new construction with parts broken away to better illustrate the details of construction.

FIG. 6 is a diagrammatic view of my new construction, illustrating its rule of action.

FIG. 7 is a view similar to FIG. 1 and showing another form of my invention.

FIG. 8 is a sectional view taken substantially as indicated by line 8—8 on FIG. 7.

FIG. 9 is a view similar to FIGS. 1 and 7 and showing another embodiment of the present invention; and FIG. 10 is an isometric view of a portion of the high pressure reinforcing structure in the form of the invention illustrated in FIG. 9 of the drawings; and, FIG. 11 is an isometric view of another form of my invention.

Referring to the drawings, FIG. 1 shows my new inflatable escape chute C related to an aircraft A, in working condition, that is, inflated and in position to accept escapees from the aircraft and to conduct them to the ground G. The aircraft A is shown as having a floor 10 a door opening 11 and an outwardly opening compartment 12 below the door and the floor. The door, for the door opening being outwardly opening, is not shown. A closure 13 for the compartment 12 is shown pivoted downwardly in its open position relative to the compartment.

The compartment 12 is adapted to normally accommodate and contain the chute C, when said chute is not in use, that is, when it is deflated and folded up in packaged condition.

The chute C, when inflated and in operating position, as illustrated in the drawings, is an elongate structure extending laterally outwardly and downwardly from the aircraft A to the ground G, at an angle of approximately 45 degrees. The chute C has an upper inner end, a lower outer end and substantially parallel sides.

The chute C includes generally, an inflatable, low pressure primary frame F, an inflatable high pressure, secondary or reinforcing frame R, a flexible membrane or fabric strip S fixed to and carried by the primary frame and defining a flat substantially upwardly disposed longitudinally extending slide surface. The chute construction further includes elongate laterally spaced, inflatable, low pressure rail-like retaining tubes or rails T fixed to and extending longitudinally along the upper sides of the primary frame F and the sides of the strip S.

In addition to the foregoing, the chute construction C includes anchoring means B to secure the upper inner end of the chute to the aircraft A and inflating means X to inflate the construction.

The primary frame F is an elongate unitary structure formed or made up of thin, light weight, impervious rubberized or plasticized fabric and includes a pair of elongate longitudinally extending, laterally spaced tubular beams 20 and inner and outer transversely extending tubular spreaders 21 and 22 at and extending between the inner and outer ends of the beams. The tubular beams 20 and tubular spreaders 21 and 22 are in open communication with each other and their related ends are preferably mitered and joined together to define a neat, rectangular frame-like unit.

The tubular parts and/or portions of the frame F are preferably round in cross-section and are of considerable diametric extent, for example, 14 or 15 inches. The overall longitudinal extent of the frame F may be approximately 15 feet and the lateral extent thereof is approximately 4 feet.

The dimensions given above are simply given as examples and can, in practice, vary widely without departing from the spirit of this invention.

The flexible membrane or fabric strip S is established of thin, light weight, rubberized or plasticized fabric having smooth surfaces. The strip S is an elongate rectangular sheet substantially equal in longitudinal and lateral extent with the distances between the central longitudinal vertical planes of the spreaders and the beams of the frame F. The end and side edge portions of the strip S establish flat bearing engagement on the adjacent top surfaces of the frame F and are fixed thereto by suitable cement. The top of the strip S, thus related to the frame F establishes a flat, smooth slide surface extending centrally and longitudinally of the construction.

The rail-like retainer tubes T are established of the same material as is the frame F. The tubes T are closed at their ends, are preferably round in cross-section, are substantially co-extensive with the longitudinal extent of the strip S and are cemented or otherwise suitably secured to the opposite sides of the construction in juxtaposition with the sides of the strip S to project upwardly therefrom. The tubes T cooperate with the strip S and frame F to define a longitudinally extending upwardly opening trough to receive escapees engaged on and sliding along the slide surface of the construction and prevent the escapees from sliding laterally and out of engagement with the chute.

The tubes T and beams 20 of the frame F are provided with registering openings 25 which openings establish communication between the said tubular parts and facilitate inflating of the construction. Since the side edge portions of the sheet S occur between the beams 20 and tubes T, suitable opening 25' are provided in the side edge portions of the sheet S to register with the openings 25 in said beams and tubes.

In light of the above noted communication between the frame F and tubes T, it will be apparent that the tubes T are low pressure members and are rather soft and yielding, as is the frame F.

The tubes T are rather small in diameter compared with the beams 20 of the frame F.

The structure thus far described is not unlike certain basic escape chute constructions provided by the prior art. The major distinction being that in those chutes of similar construction provided by the prior art, thwart tubes are provided between the beams, at space points longitudinally of the construction to provide necessary lateral stiffness and rigidity to the constructions. Such thwart tubes are not only complicated and costly to established, but they also tend to establish obstructions which interfere with the free sliding of escapees down the chutes, as some flexing and sagging of the strips S occurs between the beams when escapees are engaged thereon. To avoid the tendency for thwart tubes to adversely affect operation of such constructions, they must be strategically located. Such required special location of thwart tubes can materially affect their effectiveness.

In the present invention, frame R that I provide is an elongate unitary structure and includes a pair of elongate laterally spaced, parallel tubular stringers 30 with inner and outer ends and longitudinally spaced transversely extending tubular thwart tubes 31 and 31' extending between said stringers. The stringers 30 are preferably slightly greater in longitudinal extent than the beams 20 of the primary frame F and have upwardly turned end portions 32 at their outer ends.

The frame R is arranged adjacent the bottom side of the frame F with the stringers 30 thereof engaged and extending along or longitudinally of the tubular beams 20, with the thwart tubes 31 and 31' extending between the stringers and below the frame F and with the end portions 32 extending upwardly and about the lower end (spreader tube 22) of the frame. The frame R is fixed to the frame F by cement or other suitable means.

The end portions 32 of the stringers 30, at the outer end of the construction establish laterally spaced ground engaging pads or feet at and about the outer lower end of the construction.

The frame R is a high pressure frame and is, therefore, quite stiff and resilient when inflated and greatly reinforces the overall construction against vertical and lateral bending and flexing.

The frame R is established of light, flexible, non-elastic, rubberized or plasticized, imperforated sheet material. The stringers and thwart tubes 30, 31 and 31' of the frame R are in open communication with each other and are small in cross-section with the result that the volumetric extent of the frame R is very small as compared with the volumetric extent of the frame F.

Structurally, the stringers 30 of the frame F being fixed to and extending longitudinally of the bottom sides of the tubular beams 20, are on the sides of the beam occurring below the central mean axes of the beams and which are subjected to tension forces if and when the chute construction is caused to break and bend downwardly, intermediate its ends, by the weight of an escapee thereon. Accordingly, the stringers 30 of the frame F normally yieldingly prevent flexing of the frame F and overall chute construction in a downward direction, as they inherently resist stretching, when subjected to tension forces.

It is to be noted that the restaining tubes T at the top sides of the frame F occur above the central mean axis of the beams 20 and are subjected to compressive forces when downward flexing and bending of the construction takes place. The tubes T, in the case illustrated are small in diameter and are inflated with low pressure. Accordingly, the tubes T afford little or no resistance to such bending and/or flexing of the construction.

When an escapee is engaged on the surface of the strip S, his weight thereon tends to torque the top sides of the beams 20 of the frame F laterally inwardly and downwardly. Such torquing of the beams 20 result in a counter movement or rotation of the bottom sides of the beam. The thwart tubes 31 and 31' of the frame R, extending between the lower sides of the construction are tensioned by and resist the noted torquing of the frame F and effectively and materially strengthen the stability of the construction.

It is to be further noted that the thwart tubes 31 and 31' of the frame R, occurring below the plane of the frame F, are spaced sufficiently below the strip S that upon limited downward flexing of the strip S, as when an escapee is engaged thereon, the thwart tubes are clear of and in no way interfere with the operation of the construction, as by creating obstructions over which an escapee must ride.

In addition to the foregoing, the resinforcing frame R is provided with gusseting means G at its upper inner end, which means is adapted to extend between the bottom of the inner end portion of the chute and the side of the fuselage of the aircraft A below the door opening 11 therein, to normally yieldingly hold the upper end portion of the chute at a predetermined angle with respect to the aircraft and to prevent said upper end portion of the chute from being flexed and deflected downwardly and inwardly with respect to the aircraft, when an escapee moves into engagement on the construction.

It is to be noted that in the absence of the gusseting means G, the possibility exists that the upper inner portion of the chute will be deflected downwardly, by engagement of an escapee thereon, to such an extent that the lower outer end of the chute will shift inwardly to such an extent and as to render the structure inoperative.

Still further, the gusseting means G serves to direct and hold the construction outwardly from the aircraft, during inflation of the construction and in such a manner as to prevent the chute from swinging or otherwise moving underneath the aircraft, during inflation and in such a manner as to render the construction inoperative.

The means G includes substantially V or wedged shaped, inflatable, extension or protuberances 35 formed integrally on and projecting downwardly from the upper end portions of the stringers 30 and defining substantially longitudinally inwardly disposed, vertical craft engaging edges or surfaces 36.

In practice, the edges 36 fair into the upper tubular spreader 22 and can be shaped or formed, in a predetermined manner, to cooperate with the exterior configuration of the aircraft with which the construction is to be related.

The upper portions of the protuberances establish the upper end portions of the stringers 30.

In practice, the thwart tube 31' at the upper inner end portion of the frame R can be arranged to occur between the wedge shaped protuberances of the means G, to prevent lateral shifting and displacement of said means G, as clearly illustrated in the drawings.

The wedge extensions of protuberances 35 are, like the remainder of the construction, inflatable and are established of flexible material. Accordingly, the said protuberances are somewhat resilient. In operation, as illustrated in FIG. 6 of the drawings, when the chute construction is flexed downwardly, intermediate its ends, by the weight of an escapee thereon, the protuberances 35, better defined as resilient gussets, while resiliently yieldingly holding the upper end portion of the construction outwardly, are free to collapse a slight and limited extent and permit limited and controlled downward and inward pivoting or movement of the supper end portion of the construction. As soon as the weight of the escapee moves longitudinally down and outward on the slide surface a predetermined distances, the resiliency of the gussets 35 yieldingly urges and returns the upper portion of the chute construction to its normal position.

While in the foregoing, I have emphasized the necessity of reinforcing the basic chute construction to prevent undesired breaking, bending and/or distortion thereof, it is highly important and desirable that the chute construction break or bend intermediate its ends, in a predetermined manner to first, slow the escapee as he moves down the chute and second, to eject the escapee from the lower end of the chute construction.

To gain the desired slowing effect and the desired ejecting effect, the chute must bend or break downwardly, transversely of the construction, at or between the outer quarter and inner three quarters or the outer one third and inner two thirds of its length. The exact point of break for optimum effect varies accordingly to the structural stiffness and rigidity of the chute with respect to the exact angle of the chute and the weight of the escapee on the chute. Accordingly, location of the break point must necessarily be a comprise based upon known and anticipated factors.

In accordance with the present invention, the break point in the chute C may be built into the construction by break means M established by break sections 40 in the stringers 30 of the frame R. The break sections 40 are sections of limited longitudinal extent, intermediate the ends of the stringers where the cross-sectional extent of the stringers is reduced.

In the case illustrated, the stringers 30 are substantially rectangular in cross-section and the break sections 40 are shown as short portions in the stringers reduced both vertically and laterally.

In practice, lateral or vertical reduction of the cross-sectional extent of the sections 40 will establish the desired break line laterally of the construction.

By properly locating the break line, the chute will break downwardly by the weight of a descending escapee to first slow his rate of descent and to subsequently spring back to its normal, straight condition, when the escapee advances a predetermined distance along the chute and to thereby urge the escapee upwardly and outwardly from the lower, outer discharge end of the construction.

The ejecting action should be such that the escapee is ejected in a substantially upright walking or running position. Excessive ejecting action is apt to propel the escapee forwardly so that he will land face down on the ground, while insufficient ejecting action will cause him to land on the ground back side down or to come to rest at the foot or outer end portion of the chute. Accordingly, control of the breaking action in the chute must be carefully established. With the means M provided by this invention the establishment of the desired breaking action can be accomplish with a minimum of work and effort.

In the preferred form and carrying out of this invention and as illustrated in the drawings, the stringers and thwart tubes of the high pressure secondary frame R are rectangular in cross-section, having flat top and bottom walls 45 and 46 and substantially flat side walls 47. The top and bottom walls 45 and 46 are integrally joined together by a multiplicity of threads or filaments 48 of predetermined length fixed to and extending between said walls. The filaments 48 serve to maintain the thin, flexible and light weight walls in predetermined spaced, parallel relationship and permit the tubular structure to be inflated to considerable or great pressures without distortion or being blown out.

The side walls 47 are simple, thin, flexible non-resilient and impervious ribbons or tapes of material extending between related side edges of the top and bottom walls and having edge portions engaged over and cemented or otherwise suitably secured to the outside, side portions of the top and bottom walls.

It will be apparent that since the rails and thwart tubes of the frame R are box sections, they are inherently more rigid and resist bending and flexing to a much greater extent than simple round tube sections, such as are employed in the frame F. Such a configuration supplements the stiffening effect sought to be gained by high inflation pressures.

When and if the tubular members of the frame R are bent or broken, air and/or gas therein is displaced at and adjacent the area of bending. This displacement of air and/or gas would ordinarily result in increased inflation and distortion of the remainder of the tubular members. However, in the instant invention, the filaments prevent such displacement of air from distorting and further inflating the tube members and the displaced air results in increased pressure being generated in the construction, with resulting increased stiffening of the construction.

The gussets of the means G are made of similar tied together sheets and of strip or ribbon materials, except the inner and outer vertical side walls 45' and 46' thereof are those walls which are tied together by the filaments 48' and the side walls 47', about the perimeter of the gussets, are established of the ribbon or strip material (see FIG. 5 of the drawings).

With this relationship of parts, the gussets are box-like sections and the side walls 45' and 46' are not prevented from collapsing or shifting laterally or inwardly towards each other, the filaments 48' prevent said side walls from moving or shifting laterally outwardly and away from each other. Accordingly, any collapsing or accordioning of the gussets must be inwardly and result in increased compression of the air and gas in the construction, with resulting increased pneumatic stiffness and rigidity.

It is to be noted that while bending and deformation of the low pressure frame F may result in some increase in pressure and increased stiffness and resiliency of that frame, such increases are materially less in comparison with such increases experienced upon bending and/or deforming of the high pressure frame R.

In the form of the invention shown in FIGS. 7 and 8 of the drawings, the basic chute construction is the same as the basic chute construction in the first form of the invention and includes a primary low pressure frame F' and a slide surface forming strip S'.

The high pressure reinforcing means R' provided in the second form of the invention consists of the provision of high pressure retaining tubes T' in place of the tubes T provided in the first form of the invention and in the further provision of a short reinforcing frame R' at the outer end portion of the frame F'.

The frame R' is a substantially U-shaped high pressure inflatable unit with a transversely extending thwart tube 31 A at its inner end and outwardly extending legs or stringers 30' with upwardly turned outer end portions 32'. The frame R' is related to the frame F' with the stringers thereof fixed to and extending longitudinally along the bottom sides of the beams 20' of the frame F', at the outer end portion thereof and up and about the outer end thereof.

In practice, the upper end of the frame R', where the thwart tube 31 occurs, terminates at the transverse line along which it is desired that the chute break for control and ejection of escapees.

The tubes T' preferably terminate short of the lower end of the frame F and at a predetermined distance beyond or outward of the inner end of the frame R' so that the line along which the frame F will break is angularly related to the longitudinal and vertical planes of the chute and as indicated by the line L in FIG. 7 of the drawings. The angular break line L distributes the forces required to break the beams 20 of the frame F through a greater cross-section of the frame F and materially increases the forces required to break the frame, as the angle of said line is increased from vertical with respect to the horizontal plane of the chute construction.

It will be apparent that by varying the distance between the outer ends of the tubes T' from the inner end of the frame R' the breaking action of the construction can be advantageously controlled.

Since the tubes T' and frame R' are structurally separated from each other, the inner ends of the tubes T' are connected with the gas supply means X' and the frame R' is connected with the outer end of the tubes T' by means of transfer hoses H, as clearly illustrated in the drawings.

This second form of the invention is not provided with the gusseting means provided in the first form of the invention and is provided with another form of anchoring means B'.

In the form of the invention shown in FIGS. 9 and 10 of the drawings, the basic chute construction remains the same and is shown as including the same basic low pressure primary frame F'', the related slide surface establishing strip S'' and the low pressure retaining tubes T''.

The high pressure reinforcing means in this third form of the invention includes a sectional secondary reinforcing frame R''. The frame R'' includes an outer section O similar to the frame R' in the second form of the invention and an inner section I. The section I is similar to the inner portion of the frame R in the first form of the invention occurring longitudinally inward from and including the thwart tube 31, but without the gusset means G.

The outer and inner sections O and I of the frame R are pneumatically connected by transfer hoses H' as illustrated in the drawings.

The break means M' in this third form of the invention is established by the separation between the sections O and I of the frame and defined by the pair of adjacent, parallel thwart tubes 31B and 31C (see FIG. 10 of the drawings).

In order to limit and control the extent to which the chute can break, a tether strap 50 is fixed to and extends between the bottom sides of the frame sections I and O. The strap 50 is normally loose or untaut between the sections and is adapted to be drawn taut therebetween and to limit and stop longitudinal separation of the adjacent edges of the bottom surfaces of the frame sections I and O when the construction breaks.

In practice, the tether strap 50 can be made of elastic material and such that it resiliently and yieldingly inhibits and controls breaking of the chute construction.

The inflating or gas supply means X shown in the first form of the invention includes a cylinder or flask 60 of compressed gas, a manually operable release valve 61 connected with the neck or discharge opening of the cylinder, an aspirator 62 in the wall of the frame F and a delivery line 63 from the discharge side of the valve 61 to the aspirator 62. The means X further includes a bypass line between the line 63 and the secondary high pressure frame R and a pressure regulator 65 in said bypass line.

With the means X set forth above, it will be apparent that when the valve 61 is open high pressure gas within the cylinder 60 is conducted directly to the aspirator 62 through the line 63 and the frame F, with the tubes T related to it, are suitably inflated with a mixture of gas and air. It will be further apparent that when the valve 61 is open and high pressure gas is flowing through the line 63, a portion of said gas is tapped off and bypassed through the line 64 into the high pressure frame R, under control of the pressure regulator 65.

Accordingly, with the means X that I provide, inflation of the frames F and R, to different pressures is advantageously affected.

In the first form of the invention, the cylinder, valve and regulator of the means X can be advantageously stored in the compartment 12 of the aircraft construction.

The aspirator 62, in the preferred carrying out of the invention, is located in the outer side wall of one of the beams 20 of the frame F, adjacent the inner end of said frame where it is in substantial direct communication with the beam 20 and with the upper spreader 21 of the frame F. The bypass line 64 of the means X is preferably connected with a fitting 66 provided in the outer side wall 46' of one of the gussets G, in axial alignment with the upper thwart tube 31' which extends between the inner opposing side walls 45' of said gussets and so that the gas directed into the frame F is readily and freely directed across the frame structure, through the thwart tube 31 and into the side of said frame structure remote from that side in which the fitting 66 is located.

In the second and third forms of the invention, the aspirators 62' and 62'' are arranged in the primary low pressure frames F' and F'' in the same manner as in the first form of the invention.

In the second form of the invention, the fittings 66' to connect with the high pressure bypass lines 64 are positioned or located in the inner ends of the tubes T'.

In this second form of the invention, the means X' is shown supported and carried beneath the chute construction by a suitable fabric sling 70.

In practice and as illustrated in the third form of the invention, the means X'' can include a cylinder 60' of high pressure gas, a manually operable control valve 61' and a pair of pressure regulators 65' and 65'', each related to and adapted to control the rate and pressure of gas flowing through the lines 63' and 64'.

In light of the above, it will be apparent that the inflating or gas supply means X can vary widely in form and construction and can be related to the aircraft and/or chute construction in different ways without departing from the spirit of this invention.

In the first form of the invention, the chute construction C is adapted to be normally deflated, folded up into a tight neat package and stored in the compartment 12 of the aircraft A. In the second and third forms of the invention, and in accordance with present practice, the chute constructions are adapted to normally be deflated and folded up into neat, compact packages and suitably stored within the aircraft in convenient proximity to the door opening 11 of the craft, for example, on the door per se.

The anchoring means B, in the first form of the invention to secure and maintain the chute C in proper working relationship to the aircraft, when in use, is shown as including an elongate flexible retaining strap 80 having an outer end engaged about and fixed to the thwart tube 31' of the frame F and an inner end anchored in the chamber 12 of the aircraft A by a suitable bracket 81. The bracket 81 is located in the chamber 12 so that the upper end of the strap A occurs above and slightly inward of the lower end of the strap and the thwart tube 31' and so that the upper inner end portion of the chute C is held up and inwardly with respect to the aircraft.

In the second and third forms of the invention shown in FIGS. 7 and 9 of the drawings, the means B' and B" are established by longitudinally inwardly extending tongue-like extensions of the strips S of the chutes, which extensions are adapted to extent through the door openings 11' and 11" of their related aircraft and carry transversely extending anchor bars 82 and 82' at their inner ends. The bars have laterally outwardly projecting end portions which are adapted to engage and stop against laterally spaced fixed structures in the aircraft, occurring at opposite sides of the door openings.

In light of the above, it will be apparent that the anchoring means provided to secure the upper inner ends of the chutes to their related aircraft can vary widely without departing from the spirit of this invention.

In FIG. 11 of the drawings, I have shown another form of the invention wherein the high pressure reinforcing means includes upper and lower longitudinal stringers 30ª and 30ᵇ, coextensive with their related beams 20ª of the frame F² and joined together at their ends by substantially U-shaped coupler portions 33ª and 33ᵇ at the upper and lower ends of the construction.

If thwart tubes are to be provided in the high pressure section of this last form of the invention, such tubes are arranged between the lower stringers 30ᵇ, as indicated at 31ª.

It will be apparent that gusseting means and/or break means, such as are provided in the first and third forms of the invention can be incorporated in the fourth and last-described form of the invention without departing from the spirit of the invention.

Having described only typical preferred forms and applications of my invention, I do not wish to be limited or restricted to the specific details herein set forth, but wish to reserve to myself any modifications and/or variations that may appear to those skilled in the art and which fall within the scope of the following claims:

Having described my invention, I claim:

1. An escape chute including, an elongate, substantially horizontal, inflatable primary frame with inner and outer ends, substantially parallel sides, and defining top and bottom planes, said frame including a pair of laterally spaced, longitudinally extending, tubular beams and transversely extending tubular spreaders connected with and extending between related ends of the beams, an elongate, flexible strip adjacent the top plane of the primary frame, having side and end portions fixed to the beams and spreaders of said primary frame and defining a substantially upwardly disposed central longitudinally extending slide surface, inflatable reinforcing means to reinforce and stiffen the primary frame and including longitudinally extending inflatable stiffener tubes fixed to and extending longitudinally of the beams of the primary frame and thwart tubes connected with the stiffener tubes and extending laterally between the beams adjacent the bottom plane of the primary frame and spaced below the strip, the volumetric extent of the inflatable reinforcing means being a fraction of the volumetric extent of the primary frame, anchoring means at the inner end of the construction to connect with a related support structure and inflating means to inflate the primary frame with a large volume of gas at low pressure and to inflate the reinforcing means with a small volume of gas at high pressure.

2. A structure as set forth in claim 1 wherein said inflating means includes an aspirator in the primary frame, a hose fitting in the reinforcing means, a cylinder of compressed gas, a release valve controlling the flow of gas from the cylinder, a flow line from the valve to the aspirator and a bypass line connected with and extending between the hose fitting and flow line.

3. A structure as set forth in claim 1 which further includes elongate, laterally spaced inflatable tubular rails fixed to and extending longitudinally of the beams and the side edges of the strip to occur along the opposite sides of the slide surface and registering openings in the beams and rails establishing communication therebetween.

4. A structure as set forth in claim 1 which further includes elongate, laterally spaced inflatable tubular rails fixed to and extending longitudinally of the beams and the side edges of the strip to occur along the opposite sides of the slide surface and registering openings in the beams and rails establishing communication therebetween, said inflating means including an aspirator in the primary frame, a hose fitting in the reinforcing means, a cylinder of compressed gas, a release valve controlling the flow of gas from the cylinder, a flow line from the valve to the aspirator and a bypass line connected with and extending between the hose fitting and flow line.

5. A structure as set forth in claim 1 in which said reinforcing means includes inflatable gussets at and in communication with the inner ends of the reinforcing tubes and depending from the inner end portion of the construction and defining substantially longitudinally inwardly disposed support structure engaging surfaces.

6. A structure as set forth in claim 1 in which said reinforcing means includes inflatable gussets at and in communication with the inner ends of the reinforcing tubes and depending from the inner end portion of the construction and defining substantially longitudinally inwardly disposed support structure engaging surfaces, said inflating means including an aspirator in the primary frame, a hose fitting in the reinforcing means, a cylinder of compressed gas, a release valve controlling the flow of gas from the cylinder, a flow line from the valve to the aspirator and a bypass line connected with an extending between the hose fitting and flow line.

7. A structure as set forth in claim 1 in which said reinforcing means includes inflatable gussets at and in communication with the inner ends of the reinforcing tubes and depending from the inner end portion of the construction and defining substantially longitudinally inwardly disposed support structure engaging surfaces, said inflating means including an aspirator in the primary frame, a hose fitting in the reinforcing means, a cylinder of compressed gas, a release valve controlling the flow of gas from the cylinder, a flow line from the valve to the aspirator and a bypass line connected with and extending between the hose fitting and flow line, said structure further including elongate, laterally spaced inflatable tubular rails fixed to and extending longitudinally of the beams and the side edges of the strip to occur along the opposite sides of the slide surface and registering openings in the beams and rails establishing communication therebetween.

8. A structure as set forth in claim 1 wherein said longitudinal stiffeners extend longitudinally of the bottom sides of the beams and have upwardly turned end portions fixed to and extending about the ends of the frame and defining laterally spaced work engaging pads at and about the opposite ends of the construction.

9. A structure as set forth in claim 1 wherein said longitudinal stiffeners extend longitudinally of the bottom sides of the beams and have upwardly turned end portions fixed to and extending about the ends of the frame and defining laterally spaced work engaging pads at and about the opposite ends of the construction, said inflating means including an aspirator in the primary frame, a hose fitting in the reinforcing means, a cylinder of compressed gas, a release valve controlling the flow of gas from the cylinder, a flow line from the valve to the aspirator and a bypass line connected with and extending between the hose fitting and flow line.

10. A structure as set forth in claim 1 wherein said longitudinal stiffeners extend longitudinally of the bottom sides of the beams and have upwardly turned end portions fixed to and extending about the ends of the frame and defining laterally spaced work engaging pads at and about the opposite ends of the construction, said inflating means including an aspirator in the primary frame, a hose fitting in the reinforcing means, a cylinder of compressed gas, a release valve controlling the flow of gas from the cylinder, a flow line from the valve to the aspirator and a bypass line connected with and extending between the hose fitting and flow line, said structure further including elongate, laterally spaced inflatable tubular rails fixed to and extending longitudinally of the beams and the side edges of the strip to occur along the opposite sides of the slide surface and registering openings in the beams and rails establishing communication therebetween.

11. A structure as set forth in claim 1 wherein said stiffener tubes are sectional, there being inner sections fixed to the tops of beams and extending from the inner end of the frame and terminating short of the outer end of the frame and outer sections fixed to the bottoms of the beams and extending from the outer end of the frame and terminating inward of the outer ends of the inner sections, the outer ends of the inner sections being connected with the inner ends of the outer sections by transfer hoses, said inner and outer sections cooperating with the frame and strip whereby said chute is adapted to break downwardly intermediate its ends on a plane extending between the outer and inner ends of the outer and inner tubes.

12. A structure as set forth in claim 1 wherein said stiffener tubes are sectional, there being inner sections fixed to the tops of beams and extending from the inner end of the frame and terminating short of the outer end of the frame and outer sections fixed to the bottoms of the beams and extending from the outer end of the frame and terminating inward of the outer ends of the inner sections, the outer ends of the inner sections being connected with the inner ends of the outer sections by transfer hoses, said inner and outer sections cooperating with the frame and strip whereby said chute is adapted to break downwardly intermediate its ends on a plane extending between the outer and inner ends of the inner and outer tubes, said inflating means including an aspirator in the primary frame, a hose fitting in the reinforcing means, a cylinder of compressed gas, a release valve controlling the flow of gas from the cylinder, a flow line from the valve to the aspirator and a bypass line connected with and extending between the hose fitting and flow line.

13. A structure as set forth in claim 1 wherein said inflating means includes an aspirator in the primary frame, a hose fitting in the reinforcing means, a cylinder of compressed gas, a release valve controlling the flow of gas from the cylinder, a flow line from the valve to the aspirator and a bypass line connected with and extending between the hose fitting and flow line, said reinforcing tubes extending longitudinally of the bottom sides of the beams and including break means intermediate the ends of the construction to allow for downward breaking of the chute in a predetermined manner upon the application of a mass moving longitudinally outwardly on the slide surface, said break means including a section in each tube of reduced cross-sectional extent.

14. A structure as set forth in claim 1 wherein said inflating means includes an aspirator in the primary frame, a hose fitting in the reinforcing means, a cylinder of compressed gas, a release valve controlling the flow of gas from the cylinder, a flow line from the valve to the aspirator and a bypass line connected with and extending between the hose fitting and flow line, said reinforcing tubes extending longitudinally of the bottom sides of the beams and including break means intermediate the ends of the construction to allow for downward breaking of the chute in a predetermined manner upon the application of a mass moving longitudinally outwardly on the slide surface, said break means including a break in each tube, defining inner and outer sections, with opposing normally juxtapositioned ends and a tether strap fixed to and extending between the opposing end portions of the tube sections at the lowermost portions thereof, said straps being normally slack and adapted to be taut upon predetermined downward breaking of the chute.

15. A structure as set forth in claim 1 wherein said inflating means includes an aspirator in the primary frame, a hose fitting in the reinforcing means, a cylinder of compressed gas, a release valve controlling the flow of gas from the cylinder, a flow line from the valve to the aspirator and a bypass line connected with and extending between the hose filling and flow line, said reinforcing tubes extending longitudinally of the bottom sides of the beams and including break means intermediate the ends of the construction to allow for downward breaking of the chute in a predetermined manner upon the application of a mass moving longitudinally outwardly on the slide surface, said break means including a break in each tube, defining inner and outer sections, with opposing normally juxtapositioned ends and a tether strap fixed to and extending between the opposing end portions of the tube sections at the lowermost portions thereof, said straps being elastic and normally yieldingly resisting downward breaking and pivoting of the said opposing ends of the tube sections.

16. A structure as set forth in claim 1 wherein said tubes of the reinforcing means are substantially rectangular in cross-section having two flat, opposing, flexible, non-resilient walls with a multiplicity of flexible filaments of predetermined length fixed to and extending therebetween and two opposing other walls of flexible, nonresilient material whereby inflation and distending of said tubes is limited and said walls normally resist movement from their normal planes.

17. A structure as set forth in claim 1 in which said reinforcing means includes inflatable gussets at and in communication with the inner ends of the reinforcing tubes and depending from the inner end portion of the construction and defining substantially longitudinally inwardly disposed support structure engaging surfaces, said inflating means including an aspirator in the primary frame, a hose fitting in the reinforcing means, a cylinder of compressed gas, a release valve controlling the flow of gas from the cylinder, a flow line from the valve to the aspirator and a bypass line connected with and extending between the hose fitting and flow line, said reinforcing tubes extending longitudinally of the bottom sides of the beams and including break means intermediate the ends of the construction to allow for downward breaking of the chute in a predetermined manner upon the application of a mass moving longitudinally outwardly on the slide surface, said break means including a section in each tube of reduced cross-sectional extent, said tubes and gussets of the reinforcing means are substantially rectangular in cross-section having two flat, opposing, flexible, nonresilient walls with a multiplicity of flexible filaments of predetermined length fixed to and extending therebetween and two opposing other walls of flexible, nonresilient material whereby inflation and distending of said tubes is limited and said walls normally resist movement from their normal planes.

18. A structure as set forth in claim 1 in which said reinforcing means includes inflatable gussets at and in communication with the inner ends of the reinforcing tubes and depending from the inner end portion of the construction and defining substantially longitudinally inwardly disposed support structure engaging surfaces, said inflating means including an aspirator in the primary frame, a hose fitting in the reinforcing means, a cylinder of compressed gas, a release valve controlling the flow of gas from the cylinder, a flow line from the valve to the aspirator and a bypass line connected with and extending between the hose fitting and flow line, said inflating means including an aspirator in the primary frame, said reinforcing tubes extending longitudinally of the bottom sides of the beams and including break means intermediate the ends of the construction to allow for downward breaking of the chute in a predetermined manner upon the application of a mass moving longitudinally outwardly on the slide surface, said break means including a break in each tube, defining inner and outer sections, with opposing normally juxtapositioned ends and a tether strap fixed to and extending between the opposing end portions of the tube sections at the lowermost portions thereof, said straps being normally slack and adapted to be taut upon predetermined downward breaking of the chute, said tubes and gussets of the reinforcing means are substantially rectangular in cross-section having two flat, opposing, flexible, nonresilient walls with a multiplicity of flexible filaments of predetermined length fixed to and extending therebetween and two opposing other walls of flexible, nonresilient material whereby inflation and distending of said tubes is limited and said walls normally resist movement from their normal planes.

References Cited

UNITED STATES PATENTS

| | | | |
|---|---|---|---|
| 2,765,131 | 10/1956 | Boyle | 182—48 |
| 2,936,056 | 5/1960 | Heyniger | 193—25 |
| 3,018,867 | 1/1962 | Heyniger | 193—25 |
| 3,070,203 | 12/1962 | Hailstone | 182—48 |
| 3,102,623 | 9/1963 | Schacht | 182—48 |

REINALDO P. MACHADO, Primary Examiner

U.S. Cl. X.R.

193—25